(12) United States Patent
Strano

(10) Patent No.: US 10,906,400 B1
(45) Date of Patent: Feb. 2, 2021

(54) VEHICULAR RADIO AND RECORDING SYSTEM

(71) Applicant: Christine Strano, Mansfield, MA (US)

(72) Inventor: Christine Strano, Mansfield, MA (US)

( * ) Notice: Subject to any disclaimer, the term of this patent is extended or adjusted under 35 U.S.C. 154(b) by 0 days.

(21) Appl. No.: 16/545,034

(22) Filed: Aug. 20, 2019

(51) Int. Cl.
*B60K 35/00* (2006.01)
*G11B 31/00* (2006.01)
*H04R 1/02* (2006.01)

(52) U.S. Cl.
CPC ............ *B60K 35/00* (2013.01); *G11B 31/003* (2013.01); *H04R 1/026* (2013.01); *B60K 2370/148* (2019.05); *B60K 2370/782* (2019.05); *H04R 2499/13* (2013.01)

(58) Field of Classification Search
USPC ............. 381/71.4, 77, 86, 87, 150, 365, 389
See application file for complete search history.

(56) References Cited

U.S. PATENT DOCUMENTS

| | | |
|---|---|---|
| 5,633,837 A | 5/1997 | Gantt |
| 6,067,278 A | 5/2000 | Owens |
| 6,961,549 B2 | 11/2005 | Mori |
| 7,027,602 B2 | 4/2006 | Goodman |
| 7,343,141 B2 | 3/2008 | Ellis |
| D789,261 S | 6/2017 | Goedecke |
| 2010/0229207 A1* | 9/2010 | Eckhardt ............ H04N 21/4263 725/75 |
| 2019/0143904 A1* | 5/2019 | Hedebouw ............. H04R 1/403 381/302 |

FOREIGN PATENT DOCUMENTS

EP 2228924 9/2010

* cited by examiner

*Primary Examiner* — Yosef K Laekemariam

(57) ABSTRACT

The vehicular radio and recording system comprises a vehicle and a recording appliance. The recording appliance mounts in the vehicle. The vehicle further comprises a vehicle audio entertainment device, a VECU, and a steering wheel. The vehicle audio entertainment device further comprises an audio output. The recording appliance electrically connects to the vehicle audio entertainment device and the VECU. A portion of the recording appliance mounts on the steering wheel. The recording appliance: a) captures audible sounds generated within the vehicle and converts the captured audible sounds into electrical signals; and, b) captures electrical signals generated by the vehicle audio entertainment device. The recording appliance converts the captured electrical signals into one or more audio files for storage.

18 Claims, 3 Drawing Sheets

VEHICULAR RADIO AND RECORDING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of physics, instruments, and information storage, more specifically, an arrangement for recording audio with a radio receiver. (G11B31/003)

SUMMARY OF INVENTION

The vehicular radio and recording system comprises a vehicle and a recording appliance. The recording appliance mounts in the vehicle. The vehicle further comprises a vehicle audio entertainment device, a VECU, and a steering wheel. The vehicle audio entertainment device further comprises an audio output. The recording appliance electrically connects to the vehicle audio entertainment device and the VECU. A portion of the recording appliance mounts on the steering wheel. The recording appliance: a) captures audible sounds generated within the vehicle and converts the captured audible sounds into electrical signals; and, b) captures electrical signals generated by the vehicle audio entertainment device. The recording appliance converts the captured electrical signals into one or more audio files for storage.

These together with additional objects, features and advantages of the vehicular radio and recording system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicular radio and recording system in detail, it is to be understood that the vehicular radio and recording system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicular radio and recording system.

It is therefore important that the claims be regarded as including such equivalent construction insofar as they do not depart from the spirit and scope of the vehicular radio and recording system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
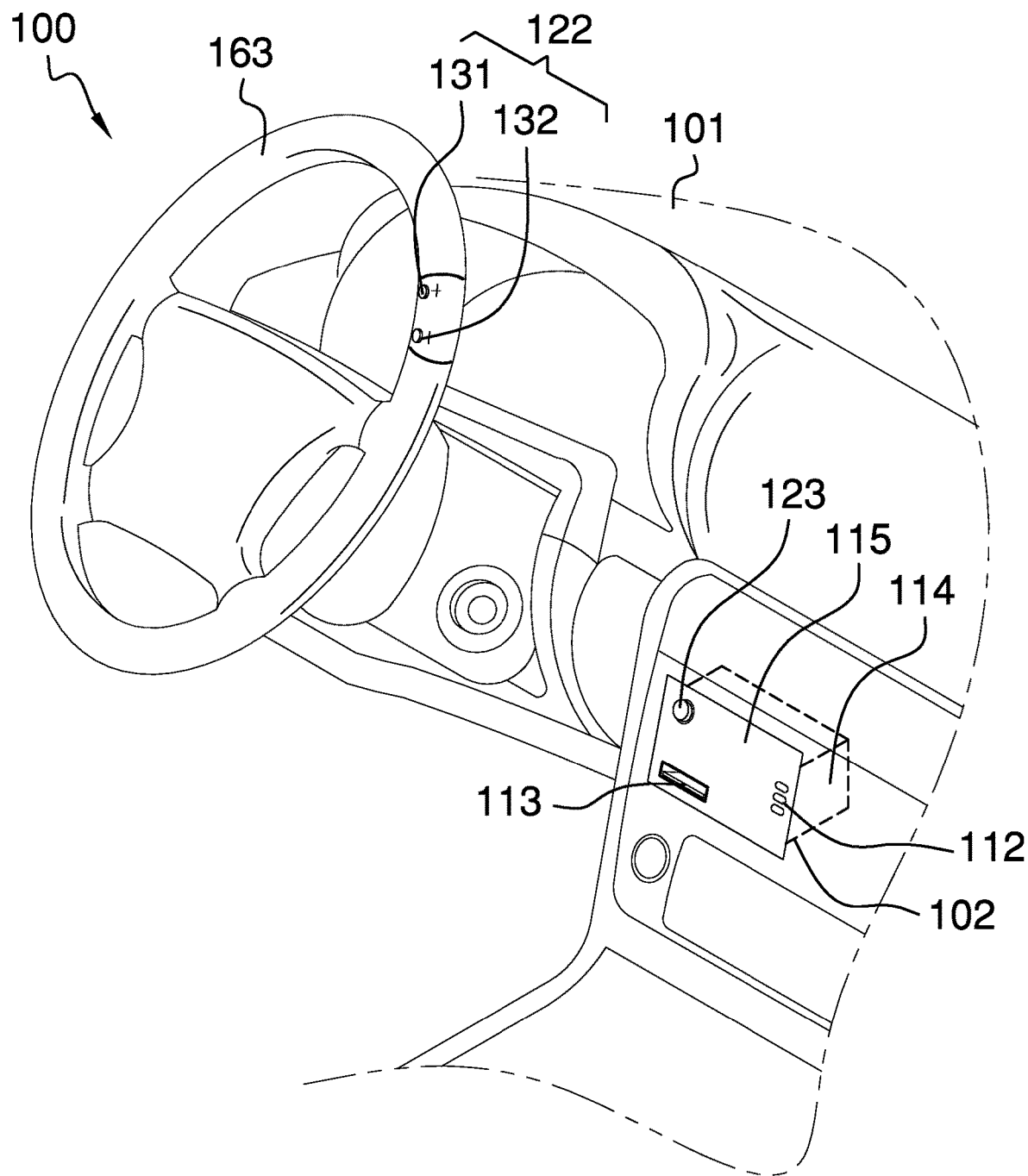
FIG. 1 is a perspective view of an embodiment of the disclosure.
Figure 2:
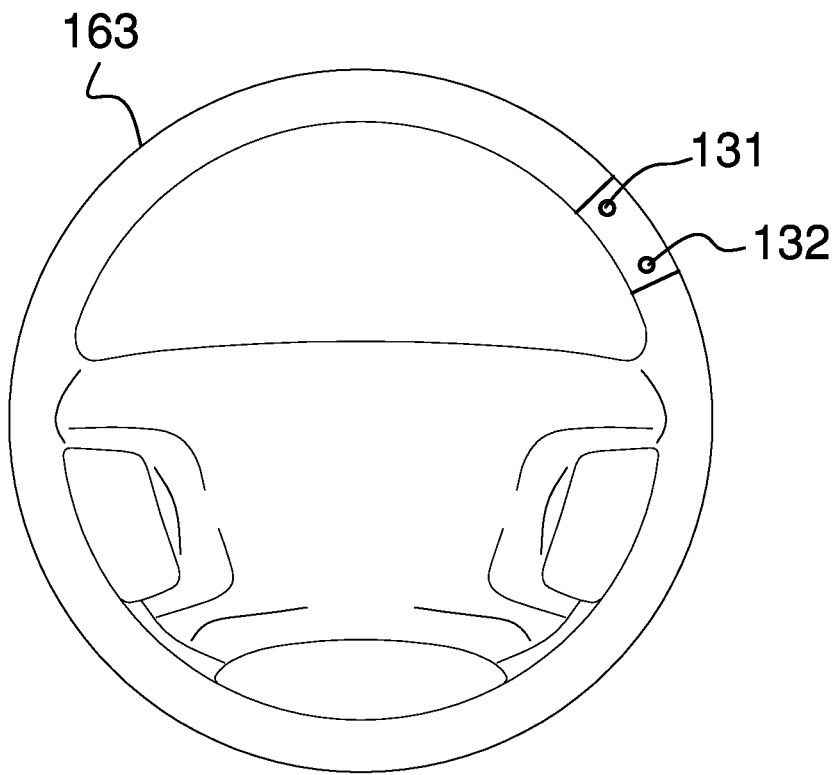
FIG. 2 is a detail view of an embodiment of the disclosure.
Figure 3:
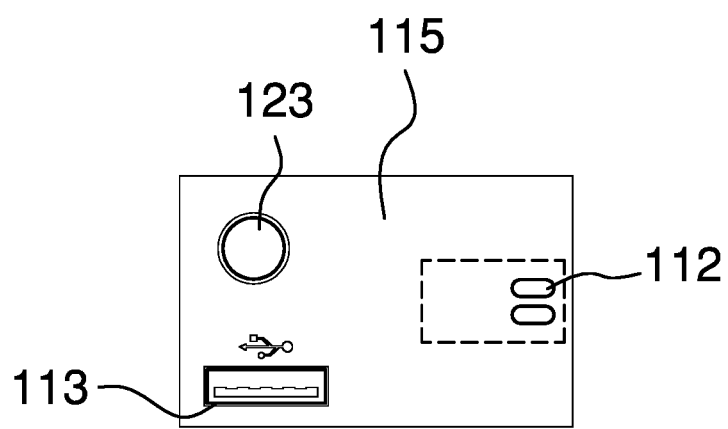
FIG. 3 is a detail view of an embodiment of the disclosure.
Figure 4:
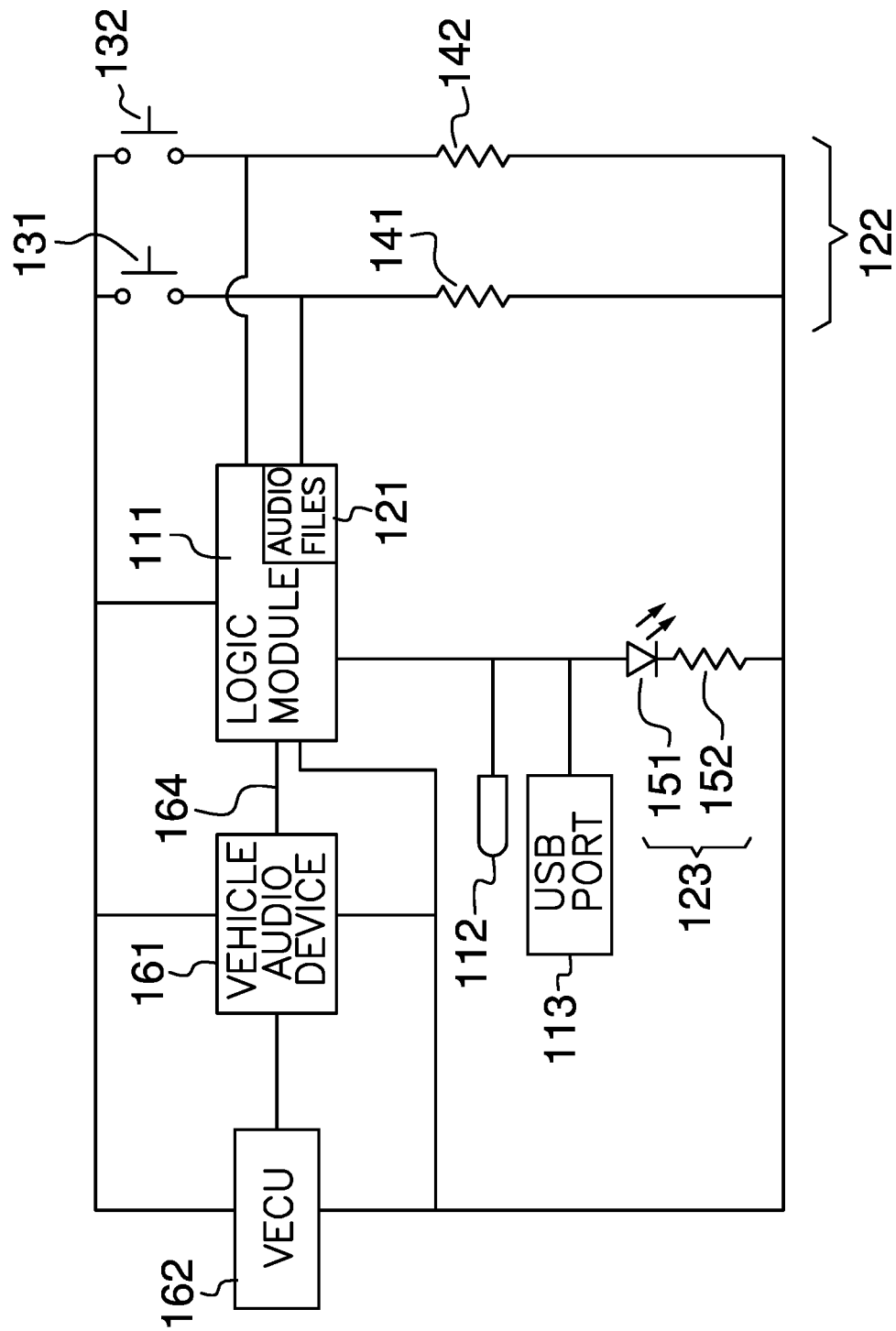
FIG. 4 is a block diagram of an embodiment of the disclosure.

Detailed reference will now be made to one or more potential embodiments of the disclosure, which are illustrated in FIGS. 1 through 4.

The vehicular radio and recording system 100 (hereinafter invention) comprises a vehicle 101 and a recording appliance 102. The recording appliance 102 mounts in the vehicle 101. The vehicle 101 further comprises a vehicle 101 audio entertainment device 161, a VECU 162, and a steering wheel 163. The vehicle 101 audio entertainment device 161 further comprises an audio output 164. The recording appliance 102 electrically connects to the vehicle 101 audio entertainment device 161 and the VECU 162. A portion of the recording appliance 102 mounts on the steering wheel 163. The recording appliance 102: a) captures audible sounds generated within the vehicle 101 and converts the captured audible sounds into a second set of electrical signals; and, b) captures a first set of electrical signals generated by the vehicle 101 audio entertainment device 161. The recording appliance 102 converts the captured first set of electrical signals into one or more audio files 121 for storage. The recording appliance 102 converts the captured second set of electrical signals into one or more audio files 121 for storage.

The vehicle 101 is a motorized device configured to operate over a road network. An example of a vehicle 101 is an automobile. The vehicle 101 is defined elsewhere in this disclosure. The vehicle 101 comprises a vehicle 101 audio entertainment device 161, a VECU 162, and a steering wheel 163.

The vehicle 101 audio entertainment device 161 is an information delivery device that announces information in the form of audible sounds into the interior of the vehicle 101. The vehicle 101 audio entertainment device 161 further comprises an audio output 164. The audio output 164 forms an electrical connection between the vehicle 101 audio entertainment device 161 of the vehicle 101 and the recording appliance 102. The audio output 164 transmits the first set of electrical signals to the recording appliance 102. The first set of electrical signals encodes the audible information announced by the vehicle 101 audio entertainment device 161.

The VECU 162 is the electrical system of the vehicle 101. The VECU 162 provides the electrical energy required to operate the recording appliance 102 and the VECU 162. The VECU 162 is defined elsewhere in this disclosure.

The steering wheel 163 is a mechanical device. The steering wheel 163 provides the navigational control required for the safe operation of the vehicle 101. Other control elements of the vehicle 101 mount on the steering wheel 163. The steering wheel 163 is defined elsewhere in this disclosure.

The recording appliance 102 is an electrical device. The recording appliance 102 installs in the vehicle 101. The recording appliance 102 captures the first set of electrical signals generated by the vehicle 101 audio entertainment device 161 through the audio output 164. The recording appliance 102 converts the first set of electrical signals from the audio output 164 into an audio file that forms a portion of the one or more audio files 121. The audio file is defined elsewhere in this disclosure. The recording appliance 102 captures audible sounds occurring within the vehicle 101 and converts the captured sounds into the second set of electrical signals. The recording appliance 102 converts the second set of electrical signals into an audio file that forms a portion of the one or more audio files 121. The recording appliance 102 transfers the one or more audio files 121 to an externally provided memory device.

The recording appliance 102 comprises a logic module 111, a microphone 112, a USB port 113, and a housing 114. The logic module 111, the microphone 112, and the USB port 113 are electrically interconnected. The housing 114 contains the logic module 111, the microphone 112, and the USB port 113.

The housing 114 is a rigid structure. The housing 114 contains the logic module 111, the microphone 112, and the USB port 113. The housing 114 is formed with all apertures and form factors necessary to allow the housing 114 to accommodate the use, the operation, and the external connections of the logic module 111, the microphone 112, and the USB port 113. Methods to form a housing 114 suitable for the purposes described in this disclosure are well-known and documented in the mechanical arts. The housing 114 further comprises a front panel 115. The front panel 115 forms an exterior surface of the housing 114. The housing 114 mounts in the vehicle 101 such that the front panel 115 is visible and accessible from the interior of the vehicle 101.

The logic module 111 is a programmable electrical circuit. The logic module 111 controls the operation of the recording appliance 102. The logic module 111 electrically connects to the microphone 112.

The logic module 111 controls the operation of the microphone 112. The logic module 111 electrically connects to the USB port 113. The logic module 111 controls the operation of the microphone 112. The logic module 111 electrically connects to the audio output 164 of the vehicle 101 audio entertainment device 161. The logic module 111 receives the first set of electrical signals generated by the vehicle 101 audio entertainment device 161 through the audio output 164. The logic module 111 receives the second set of electrical signals from the microphone 112. The logic module 111 converts the first set of electrical signals into the audio file that forms a portion of the one or more audio files 121. The logic module 111 converts the second set of electrical signals into the audio file that forms a portion of the plurality of control switches 122. The logic module 111 stores the one or more audio files 121. The logic module 111 transfers the one or more audio files 121 to an externally provided memory device using the USB port 113.

The logic module 111 further comprises one or more audio files 121, a plurality of control switches 122, and an indicator light 123.

Each of the one or more audio files 121 is a digital representation of an electrical signal selected from the group consisting of the first set of electrical signals and the second set of electrical signals. The logic module 111 stores the one or more audio files 121. The logic module 111 controls access to the one or more audio files 121.

Each of the plurality of control switches 122 is a switching circuit. Each of the plurality of control switches 122 presents a voltage to the logic module 111. The logic module 111 monitors the voltage presented to the logic module 111 by each of the plurality of control switches 122.

The presentation of a voltage by a control switch selected from the plurality of control switches 122 to the logic module 111 signals the logic module 111 to initiate the capture of the first set of electrical signals. The presentation of a voltage by a control switch selected from the plurality of control switches 122 to the logic module 111 signals the logic module 111 to initiate the capture of the second set of electrical signals. The presentation of a voltage by a control switch selected from the plurality of control switches 122 to the logic module 111 signals the logic module 111 to discontinue the capture of the first set of electrical signals. The presentation of a voltage by a control switch selected from the plurality of control switches 122 to the logic module 111 signals the logic module 111 to discontinue the capture of the second set of electrical signals.

The plurality of control switches 122 further comprises a first switch 131, a first load resistor 141, a second switch 132, and a second load resistor 142.

The first switch 131 is a momentary switch. The first switch 131 electrically connects in series with the first load resistor 141. The first switch 131 controls the flow of electricity from the VECU 162 into the first load resistor 141. The first load resistor 141 is an electrical circuit element. The first load resistor 141 generates an electric voltage when an electric current flows through the first load resistor 141. The logic module 111 measures the electric voltage across the first load resistor 141. When the logic module 111 detects a voltage across the first load resistor 141, the logic module 111 takes an action selected from the group consisting of: a) initiating the capture of the first set of electrical signals; and, b) discontinuing the capture of the first set of electrical signals.

The second switch 132 is a momentary switch. The second switch 132 electrically connects in series with the second load resistor 142. The second switch 132 controls the flow of electricity from the VECU 162 into the second load resistor 142. The second load resistor 142 is an electrical circuit element. The second load resistor 142 generates an electric voltage when an electric current flows through the second load resistor 142. The logic module 111 measures the electric voltage across the second load resistor 142. When the logic module 111 detects a voltage across the second load resistor 142, the logic module 111 takes an action selected from the group consisting of: a) initiating the capture of the second set of electrical signals; and, b) discontinuing the capture of the second set of electrical signals.

The indicator light 123 is a lamp. The logic module 111 controls the operation of the indicator light 123. The logic module 111 illuminates the indicator light 123 when the logic module 111 is capturing an electrical signal selected from the group consisting of the first set of electrical signals and the second set of electrical signals. The indicator light 123 extinguishes the indicator light 123 when the logic module 111 is not capturing an electrical signal selected from the group consisting of the first set of electrical signals and the second set of electrical signals. The indicator light 123 further comprises an LED 151 and a limit resistor 152.

The LED 151 is a light emitting diode. The logic module 111 controls the illumination of the LED 151 by controlling the voltage applied to the LED 151. The limit resistor 152 is an electrical circuit element. The limit resistor 152 limits the flow of electricity through the LED 151.

The microphone 112 is a transducer. The microphone 112 captures audible sounds occurring within the vehicle 101 and converts the captured sounds into the second set of electrical signals. The microphone 112 transmits the second set of electrical signals to the logic module 111. The microphone 112 mounts in the front panel 115 of the housing 114. The microphone 112 is defined elsewhere in this disclosure.

The USB port 113 is an electrical device. The USB port 113 forms an electrical connection between the logic module 111 and an externally provided memory device. The USB port 113 is compatible with USB power requirements. The USB port 113 is compatible with USB data transfer requirements. The logic module 111 transfers the one or more audio files 121 to the externally provided memory device using the USB port 113. The USB port 113 mounts in the front panel 115 of the housing 114.

The following definitions were used in this disclosure:

Announce: As used in this disclosure, to announce means to generate audible sounds over a transducer.

Audio: As used in this disclosure, audio refers to the reproduction of a sound that simulates the sound that was originally created.

Audio Device: As used in this disclosure, an audio device is a device that generates audible sound waves.

Audio File: As used in this disclosure, an audio file is a digital representation of a sound that is used to store a recording of the sound. Separate hardware is used to convert the digital representation of the sound into an audible sound.

Audio Source: As used in this disclosure, an audio source is a device that generates electrical signals that can be converted into audible sounds by an audio device such as a speaker.

Automobile: As used in this disclosure, an automobile is a road vehicle that specializes in carrying passengers and light cargo loads. This definition is specifically intended to include vehicles generally referred to as pickup trucks, vans, minivans, and sport utility vehicles. The automobile further comprises an electrical system. The automobile is further defined with a hood panel and a roof panel. The automobile is often defined with a trunk panel.

Diode: As used in this disclosure, a diode is a two terminal semiconductor device that allows current flow in only one direction. The two terminals are called the anode and the cathode. Electric current is allowed to pass from the anode to the cathode.

Form Factor: As used in this disclosure, the term form factor refers to the size and shape of an object.

Housing: As used in this disclosure, a housing is a rigid structure that encloses and protects one or more devices.

Lamp: As used in this disclosure, a lamp is an electrical device that generates visible light to illuminate objects so they can be seen.

LED: As used in this disclosure, an LED is an acronym for a light emitting diode. A light emitting diode is a diode that is also a light source.

Limit Resistor: As used in this disclosure, a limit resistor is an electrical resistor that is used to limit the flow of electric current through an electrical circuit.

Load Resistor: As used in this disclosure, a load resistor is an electrical resistor that is used to present a voltage to an electrical device. The presented voltage is controlled by controlling the amount of electrical current passing through the load resistor.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Memory Device: As used in this device, a memory device is an electronic device that stores information (including audio and video data) in a digital format. Common memory devices include the RAM (random access memory) and disk drives in a computer, USB (Universal Serial Bus) drives, DVD (Digital Video Disk) formatted video, and SD (secure digital) cards.

Microphone: As used in this disclosure, a microphone is a transducer that converts the energy from vibration into electrical energy. The sources of vibrations include, but are not limited to, acoustic energy.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Port: As used in this disclosure, a port is an electrical termination that is used to connect a first electrical circuit to a second external electrical circuit. In this disclosure, the port is designed to receive a plug.

Radio Frequency: As used in this disclosure, a radio frequency refers to electromagnetic radiation that is propagated in a spectrum ranging from 10 KHz to 1 THz.

Recording Appliance: As used in this disclosure, a recording appliance is a device that captures a permanent record of an event selected from the group consisting of an audible event, a visual event, or a combination of an audible and visual event as the selected event occurs. The permanent record is used to present subsequent reproductions of the selected event. Recording appliances are commonly used to present these subsequent reproductions. Recording appliances are well-known, well documented, and commercially available. Recording devices are often electrical devices.

Resistor: As used in this disclosure, a resistor is a well-known and commonly available electrical device that presents a resistance that inhibits the flow of electricity through an electric circuit. Within an electric circuit processing alternating currents, the resistor will not affect the phase of the alternating current. A current flowing through a resistor will create a voltage across the terminals of the resistor.

Rigid Structure: As used in this disclosure, a rigid structure is a solid structure formed from an inelastic material that resists changes in shape. A rigid structure will permanently deform as it fails under a force.

Steering Wheel: As used in this disclosure, a steering wheel is a rotating device used to change the direction of travel of a vehicle. The steering wheel is modeled after a wheel and comprises a rim, one or more spokes, and a column mount. The column mount attaches the steering wheel to the steering column of the vehicle. The column is a linkage that transmits the rotation of the steering wheel to the drive mechanism of the vehicle, which subsequently changes the direction of travel of the vehicle.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Transducer: As used in this disclosure, a transducer is a device that converts a physical quantity, such as pressure or brightness into an electrical signal or a device that converts an electrical signal into a physical quantity.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

VECU: As used in this disclosure, the VECU is an acronym for the Vehicle Engine Control Unit of the vehicle. The VECU is an electronic device that controls the operation of all electrical subsystems within a vehicle.

Vehicle: As used in this disclosure, a vehicle is a motorized device that is used for transporting passengers, goods, or equipment. The term motorized vehicle refers to a vehicle can move under power provided by an electric motor or an internal combustion engine.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A vehicular audio recording apparatus comprising comprises a vehicle and a recording appliance; wherein the recording appliance installs in the vehicle; wherein the vehicle further comprises a vehicle audio entertainment device, a VECU, and a steering wheel; wherein the vehicle audio entertainment device further comprises an audio output; wherein the recording appliance electrically connects to the vehicle audio entertainment device and the VECU; wherein a portion of the recording appliance mounts on the steering wheel; wherein the VECU is the electrical system of the vehicle; wherein the VECU provides the electrical energy required to operate the recording appliance and the VECU; wherein the recording appliance comprises a logic module processor, a microphone, a USB port, and a housing; wherein the logic module processor, the microphone, and the USB port are electrically interconnected; wherein the housing contains the logic module processor, the microphone, and the USB Port; wherein the housing is a rigid structure; wherein the logic module processor is a programmable electrical circuit; wherein the logic module processor controls the operation of the recording appliance; wherein the logic module processor electrically connects to the microphone; wherein the logic module processor controls the operation of the microphone; wherein the logic module processor electrically connects to the USB port; wherein the logic module processor controls the operation of the microphone; wherein the logic module processor electrically connects to the audio output of the vehicle audio entertainment device; wherein the logic module processor receives the first set of electrical signals generated by the vehicle audio entertainment device through the audio output; wherein the logic module processor receives the second set of electrical signals from the microphone; wherein the logic module processor converts the first set of electrical signals into the audio file that forms a portion of the one or more audio files; wherein the logic module processor converts the second set of electrical signals into the audio file that forms a portion of the plurality of control switches; wherein the logic module processor stores the one or more audio files; wherein the logic module processor transfers the one or more audio files to an externally provided memory device using the USB port.

2. The vehicular audio recording apparatus according to claim 1
   wherein the recording appliance: a) captures audible sounds generated within the vehicle and converts the captured audible sounds into a second set of electrical signals; and, b) captures a first set of electrical signals generated by the vehicle audio entertainment device;
   wherein the recording appliance converts the captured first set of electrical signals into one or more audio files;
   wherein the recording appliance converts the captured second set of electrical signals into one or more audio files.

3. The vehicular audio recording apparatus according to claim 2 wherein the vehicle audio entertainment device is an information delivery device that announces information in the form of audible sounds into the interior of the vehicle.

4. The vehicular audio recording apparatus according to claim 3 wherein the vehicle audio entertainment device further comprises an audio output;
wherein the audio output forms an electrical connection between the vehicle audio entertainment device of the vehicle and the recording appliance.

5. The vehicular audio recording apparatus according to claim 4 wherein the audio output transmits the first set of electrical signals to the recording appliance.

6. The vehicular audio recording apparatus according to claim 5 wherein the first set of electrical signals encodes the audible information announced by the vehicle audio entertainment device.

7. The vehicular audio recording apparatus according to claim 6
wherein the recording appliance is an electrical device;
wherein the recording appliance installs in the vehicle.

8. The vehicular audio recording apparatus according to claim 7 wherein the recording appliance transfers the one or more audio files to an externally provided memory device.

9. The vehicular audio recording apparatus according to claim 8
wherein the housing further comprises a front panel;
wherein the front panel forms an exterior surface of the housing;
wherein the housing mounts in the vehicle such that the front panel is visible and accessible from the interior of the vehicle.

10. The vehicular audio recording apparatus according to claim 9 wherein the logic module further comprises the one or more audio files, a plurality of control switches, and an indicator light; wherein the logic module processor stores the one or more audio files; wherein the logic module processor controls access to the one or more audio files; wherein each of the plurality of control switches is a switching circuit; wherein each of the plurality of control switches presents a voltage to the logic module processor; wherein the indicator light is a lamp; wherein the logic module processor controls the operation of the indicator light.

11. The vehicular audio recording apparatus according to claim 10 wherein the logic module processor illuminates the indicator light when the logic module processor is capturing an electrical signal selected from the group consisting of the first set of electrical signals and the second set of electrical signals; wherein the indicator light extinguishes the indicator light when the logic module processor is not capturing an electrical signal selected from the group consisting of the first set of electrical signals and the second set of electrical signals.

12. The vehicular audio recording apparatus according to claim 11 wherein each of the one or more audio files is a digital representation of an electrical signal selected from the group consisting of the first set of electrical signals and the second set of electrical signals.

13. The vehicular audio recording apparatus according to claim 12 wherein the logic module processor monitors the voltage presented to the logic module processor by each of the plurality of control switches; wherein the presentation of a voltage by a control switch selected from the plurality of control switches to the logic module processor signals, the logic module processor to initiate the capture of the first set of electrical signals; wherein the presentation of a voltage by a control switch selected from the plurality of control switches to the logic module processor signals the logic module processor to initiate the capture of the second set of electrical signals; wherein the presentation of a voltage by a control switch selected from the plurality of control switches to the logic module processor signals the logic module processor to discontinue the capture of the first set of electrical signals; wherein the presentation of a voltage by a control switch selected from the plurality of control switches to the logic module signals processor the logic module processor to discontinue the capture of the second set of electrical signals.

14. The vehicular audio recording apparatus according to claim 13
wherein the plurality of control switches further comprises a first switch, a first load resistor, a second switch, and a second load resistor;
wherein the first switch is a momentary switch;
wherein the first switch electrically connects in series with the first load resistor;
wherein the first switch controls the flow of electricity from the VECU into the first load resistor;
wherein the first load resistor is an electrical circuit element;
wherein the first load resistor generates an electric voltage when an electric current flows through the first load resistor;
wherein the second switch is a momentary switch;
wherein the second switch electrically connects in series with the second load resistor;
wherein the second switch controls the flow of electricity from the VECU into the second load resistor;
wherein the second load resistor is an electrical circuit element;
wherein the second load resistor generates an electric voltage when an electric current flows through the second load resistor.

15. The vehicular audio recording apparatus according to claim 14 wherein the logic module processor measures the electric voltage across the first load resistor; wherein the logic module processor measures the electric voltage across the second load resistor; wherein when the logic module processor detects a voltage across the first load resistor, the logic module processor takes an action selected from the group consisting of: a) initiating the capture of the first set of electrical signals; and, b) discontinuing the capture of the first set of electrical signals; wherein when the logic module processor detects a voltage across the second load resistor, the logic module processor takes an action selected from the group consisting of: a) initiating the capture of the second set of electrical signals; and, b) discontinuing the capture of the second set of electrical signals.

16. The vehicular audio recording apparatus according to claim 15 wherein the indicator light further comprises an LED and a limit resistor; wherein the LED is a light emitting diode; wherein the logic module processor controls the illumination of the LED b controlling the voltage applied to the LED; wherein the limit resistor is an electrical circuit element; wherein the limit resistor limits the flow of electricity through the LED.

17. The vehicular audio recording apparatus according to claim 16 wherein the microphone is a transducer; wherein the microphone captures audible sounds occurring within the vehicle and converts the captured sounds into the second set of electrical signals; wherein the microphone transmits the second set of electrical signals to the logic module processor; wherein the microphone mounts in the front panel of the housing.

18. The vehicular audio recording apparatus according to claim 17 wherein the USB port is an electrical device; wherein the USB port forms an electrical connection between the logic module processor and an externally provided memory device; wherein the USB port is compatible with USB power requirements; wherein the USB port is compatible with USB data transfer requirements; wherein the logic nodule processor transfers the one or more audio files to the externally provided memory device using the USB port; wherein the USB port mounts in the front panel of the housing.

\* \* \* \* \*